(12) United States Patent
Lenz, Jr.

(10) Patent No.: US 9,751,459 B1
(45) Date of Patent: Sep. 5, 2017

(54) FIREFIGHTING OR RESCUE APPARATUS INCLUDING AN INTEGRATED GRAB HANDLE AND SIGNAL LIGHT

(71) Applicant: HME, Incorporated, Wyoming, MI (US)

(72) Inventor: Kenneth C. Lenz, Jr., Hudsonville, MI (US)

(73) Assignee: HME, Incorporated, Wyoming, MI (US)

( * ) Notice: Subject to any disclaimer, the term of this patent is extended or adjusted under 35 U.S.C. 154(b) by 0 days.

(21) Appl. No.: 15/466,186

(22) Filed: Mar. 22, 2017

Related U.S. Application Data (60) Provisional application No. 62/318,910, filed on Apr. 6, 2016.

(51) Int. Cl.
*B60Q 1/46* (2006.01)
*B60Q 1/26* (2006.01)
*B60N 3/02* (2006.01)
*A62C 27/00* (2006.01)

(52) U.S. Cl.
CPC ............ *B60Q 1/2669* (2013.01); *A62C 27/00* (2013.01); *B60N 3/02* (2013.01); *B60Q 1/46* (2013.01)

(58) Field of Classification Search
CPC .......... B60Q 1/2669; B60Q 1/46; B60N 3/02; A62C 27/00
See application file for complete search history.

(56) References Cited

U.S. PATENT DOCUMENTS

| | | | |
|---|---|---|---|
| 6,523,888 B1 | 2/2003 | Yan et al. | |
| 6,793,385 B2 | 9/2004 | Tiesler et al. | |
| 6,848,818 B2 | 2/2005 | Huizenga | |
| 7,104,675 B2 | 9/2006 | Chen | |
| 7,226,191 B1 * | 6/2007 | Martinez | B60N 3/026 362/400 |
| 7,261,446 B2 | 8/2007 | Thomas | |
| 7,635,210 B2 | 12/2009 | Metros et al. | |
| 8,764,256 B2 | 7/2014 | Foote et al. | |

\* cited by examiner

*Primary Examiner* — Thomas M Sember
(74) *Attorney, Agent, or Firm* — Warner Norcross and Judd LLP (57) ABSTRACT

A firefighting or rescue apparatus includes a frame, cab and/or body to which a signal light grab handle is mounted. The signal light grab handle is operable in a flashing mode in which the signal light grab handle emits illumination in a predefined flashing pattern, and a sleep mode in which the signal light grab handle emits no illumination. The signal light grab handle includes a light strip including a plurality of light sources, such as LEDs. This strip can be coupled to a wire that extends through upper and/or lower handle attachment brackets, and through an exterior outer panel of the apparatus. The signal light grab handle provides at least one of warning lights and signal lights to observers of the firefighting apparatus when actuated.

16 Claims, 7 Drawing Sheets

FIREFIGHTING OR RESCUE APPARATUS INCLUDING AN INTEGRATED GRAB HANDLE AND SIGNAL LIGHT

BACKGROUND OF THE INVENTION

The present invention relates to a firefighting apparatus, such as a fire truck, a trailer or other vehicles, and more particularly to a firefighting apparatus with an integrated grab handle and signal/warning light.

Fire trucks and rescue vehicles typically include multiple signal and/or warning lights. These lights are available in a variety of styles and designs unique to the location of the lights on the truck and the purpose of the lights. Depending on local jurisdictional rules, fire trucks often have signal and/or warning lights on many different locations of the truck, inside and out. Popular types of lights used on fire trucks include strobe lights, surface mount lights, light bars and grille lights. The lights are available in many different warning light colors, the most popular colors being red and white, and in some jurisdictions, blue and yellow. Many higher end lights come preprogrammed to emit a multitude of flash patterns.

An issue with almost all conventional fire truck lights is that they require holes be drilled, punched or formed through panels of the body, cab and/or frame of the truck. The lights are then mounted in the holes, or the lights include wiring that extends through the holes. These light holes are in addition to the multiple other holes typically found on a fire truck to accommodate other accessories such as latches, steps and the like. The more holes there are in the truck, the more likely it is that water, chemicals and other debris can inadvertently enter the truck over time, particularly if seals around the holes degrade. In turn, this leakage, particularly in climates where salt is used on roads during winter, can lead to rust, which can prematurely compromise a fire truck's components.

Signal and warning lights on fire trucks and rescue vehicles are helpful and even required in many applications. The additional holes that are used to mount the lights, however, are undesirable. Accordingly, there remains room for improvement in the mounting of lights to fire trucks while reducing the overall number of holes in them, and the overall number of separate accessories mounted on the trucks.

SUMMARY OF THE INVENTION

A firefighting or rescue apparatus including a signal light grab handle mounted to the frame, wherein the signal light grab handle is operable to provide signal and/or warning illumination at the location of the handle. The signal light grab handle provides dual functionality as a structural handle adapted to provide personnel with a grasping surface to enter or dismount the apparatus, as well as a signal light to provide illuminated warning and/or signal lights to observers of the firefighting apparatus when actuated.

In one embodiment, the signal light grab handle is mounted to an exterior outer panel of a cab, body or frame of the apparatus. The signal light grab handle can include one or more lights joined with one or more connector wires to provide power to the lights and thereby eliminate them. The connector wires can be hidden within the structure of the signal light grab handle and can pass through internal bores thereof, and ultimately through a concealed and protected hole defined by the exterior outer panel, into the interior of the apparatus.

In another embodiment, the signal light grab handle is in electrical communication with a controller and a power source. The controller can selectively provide power from the power source to the lights. The controller can control the signal light grab handle so that is operable in a flashing mode, in which the signal light grab handle emits illumination in a predefined flashing pattern, as well as a sleep mode, in which the signal light grab handle emits no illumination. The controller also can control the signal light grab handle so that it emits light in a constant mode without interruption in illumination for a period of time.

In still another embodiment, the signal light grab handle can be constructed to include a central grab rail within which one or more recesses can be defined. These recesses can be configured to receive and protect the lights of the signal light grab handle. Optionally the lights can be disposed in a housing constructed from a weather resistant and UV resistant material, such as a polymer. This housing can further be translucent and/or transparent so that illumination emitted by the lights passes through it is visible through the housing.

In yet another embodiment, the light of the signal light grab handle can be in the form of a strip having multiple light emitting diodes (LEDs), electrically connected in series and/or in parallel. The LED strip can be positioned so that it is angled outwardly, away from the body of the truck. The LED strip can include a primary axis of illumination, which optionally can be generally perpendicular to the plane in which the LEDs of the LED strip are disposed. The primary axis of illumination can point outward, away from an outer panel of the body, for example, a cab of a fire truck.

In even another embodiment, the firefighting apparatus can be in the form of a fire truck, including a frame with a cab mounted over one or more wheels of the truck. The cab can include one or more doors on one or both sides cab. The signal light grab handle can be mounted so that the grab rail is immediately adjacent at least one of the doors to provide a graspable portion of the truck so that an occupant can ingress and/or egress relative to a cab interior.

In a further embodiment, the cab can include a first door and a third door on a single side of the truck. The signal light grab handle can be mounted rearward and distal from the first door, and forward of the third door, so that the signal light grab handle is between the first door and the third door, and not mounted on either of the first door or the third door.

In even a further embodiment, the signal light grab handle includes a longitudinal axis extending from an upper end to an opposing lower end. The longitudinal axis can be oriented substantially vertically on the truck. The signal light grab handle also can be rigidly and immovably joined with the truck. An open space can be located between the central grab rail and the exterior outer panel of the truck. This open space can be sized to enable human digits to project between the central grab rail and the outer panel while an occupant grasps the central grab rail with a hand.

The current embodiments provide a simple and effective construction that can enable features of a firefighting or rescue apparatus, such as a fire truck, to serve multiple functions. Where a firefighting apparatus is dispatched to an emergency location, the signal light grab handle can be selectively illuminated, optionally in a flashing pattern driven by the controller, to emit illumination and provide warning lights to observers of the fire truck, thereby alerting the observers to the emergency or other situation at that location. The signal light grab handle also can be selectively illuminated to operate as a signal light, for example, to act as a turn signal indicating to observers of truck that the truck is about to turn in a particular direction. The signal light grab handle of course also can function as a grasping surface to assist occupants who desire to board or deboard the apparatus. The signal light grab handle can reduce the overall number of different lights and handles attached to an extending from the exterior of the truck, and thus the number of holes in the exterior of the truck. This can simplify mounting of these elements and can enhance the integrity of the fire truck over time.

These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

A current embodiment of a firefighting apparatus is illustrated in FIGS. 1-7 and generally designated 10. The firefighting apparatus, referred to herein as a fire truck, can be a self-propelled vehicle, for example, a pumper truck as shown. Of course, although shown as a pumper fire truck, the firefighting apparatus can optionally be another type of fire truck, such as an aerial ladder truck, an emergency vehicle, a rescue vehicle and other modes of transportation such as tanker trucks or trailers, bush trucks, aerial ladder trailers or other equipment.

Figure 1:
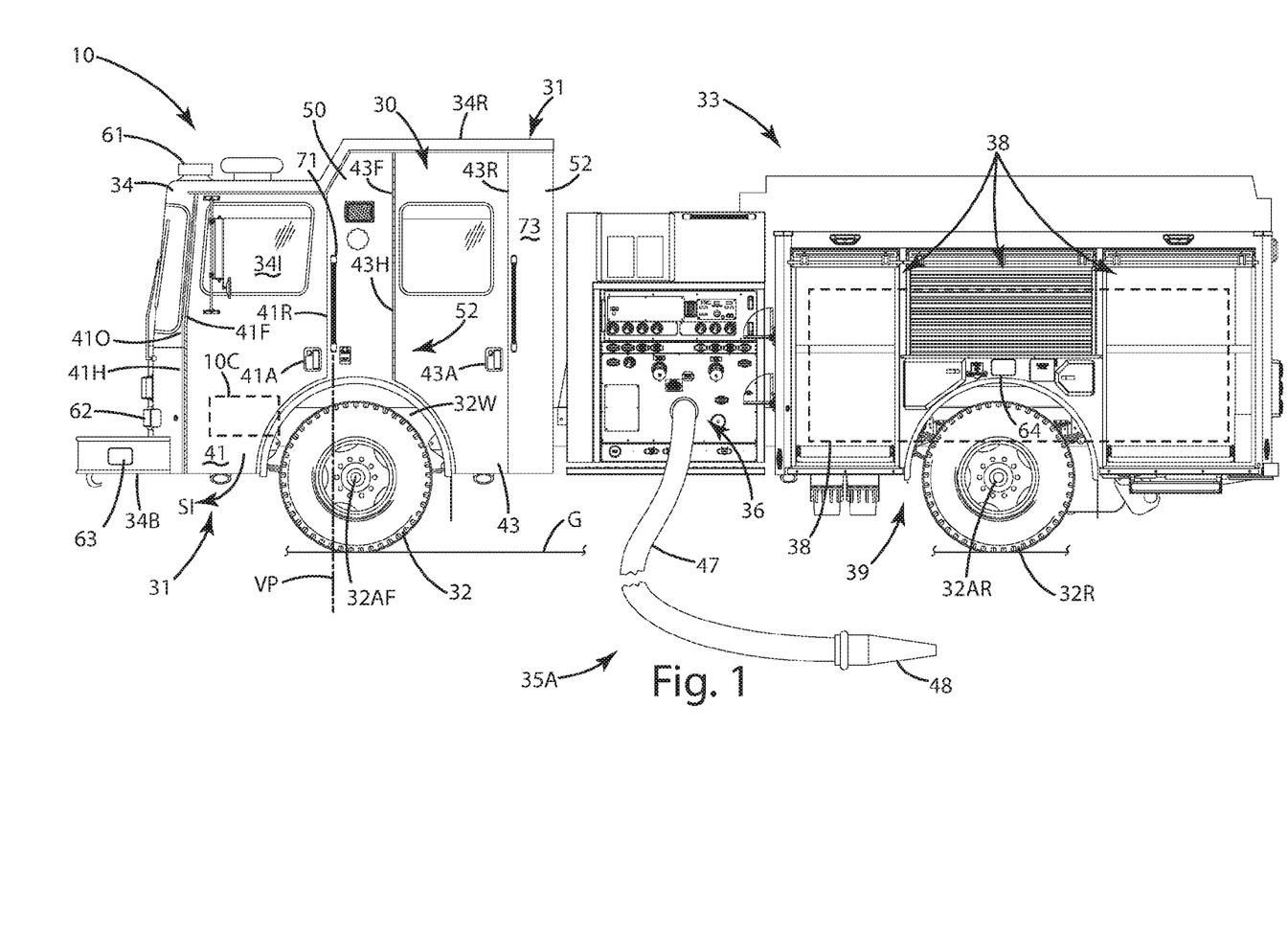
FIG. 1 is a side view of a firefighting or rescue apparatus in the form of a fire truck including signal light grab handles mounted to a cab of the truck, according to a current embodiment.

The fire truck 10 can include a frame, also referred to as a body herein, which can be mounted to a chassis which can be further mounted to multiple wheels 32. The wheels can be attached to conventional front 32AF and rear 32AR axles, which are further attached to the chassis of the truck. The fire truck can be mobilized via an internal combustion engine which drives the wheels via a transmission.

The fire truck 10 can include one or more internal electronic or computers or controllers that can operate the engine, transmission, or steering control mechanism to enable the front wheels to be steered upon transport to an emergency location. As used herein, an emergency location can be a scene of a traffic accident, a boating accident, a plane accident, a man-made or natural disaster, and/or a terrorist attack, or any other location where one or more victims' lives are endangered or otherwise compromised.

The frame or body 30 can include a forward portion 31 and a rearward portion 33 located at opposite ends of the fire truck 10. Generally the rear wheels 32R and their axle 32AR are located in the rearward portion 33 of the fire truck 10. The front or steering wheels 32 can be located in the forward portion 31 of the fire truck, and mounted to a front axle 32AF. The frame 30 in the forward portion 31 can include a cab 34. The cab 34 can house occupants, such as firefighters or rescue personnel, as they are transported to and from an emergency location. The cab 34 can include controls, such as a steering mechanism and various displays inside the cab to monitor and evaluate the operation of the vehicle 10. The cab can terminate a distance of several feet rearward of the front wheels 32, or generally forward of the pump controls 36 and/or rearward portion 33 of the fire truck 10.

A pump control panel 36 can be mounted rearward of the cab 34. Under or behind the pump control panel 36, one or more pumps 37 can be mounted. These pumps can be mounted to the frame. Generally, the pump 37 can be in fluid communication with a firefighting fluid tank 38 mounted to the frame in the rearward portion 33, and/or a source of firefighting fluid external to the truck, such as a fire hydrant. The pump also can be in fluid communication with one or more hoses or waterways 47 as described below. The pump can be configured to convey firefighting fluid from the external source or the tank to the hose 47 in a forced manner so that the firefighting fluid can be applied to a fire.

The hose 47 can be operable to transfer a continuous supply of firefighting fluid to the water outlet 48 which is generally in the form of a nozzle. Generally the hose receives pressurized firefighting fluid from a pump 37 and storage tank 38 on the frame 30. A nozzle 48 assists in pressurizing and/or shaping the continuous stream of firefighting fluid from the hose 47 toward a fire in a burning structure, such as a building, vehicle or other item.

In addition to the cab 34, the frame 30 optionally can include a body 39, rearward of the cab, having lockers 38 mounted rearward of the pump control panel 36, generally in the rearward portion 33 of the fire truck 10. The body can conceal all or a portion of the tank 38. The lockers optionally can be located on and accessible from the first 35A and second 35B sides of the fire truck, and can be sized and configured to store supplies and equipment useful for easy access at an emergency location.

Figure 4:
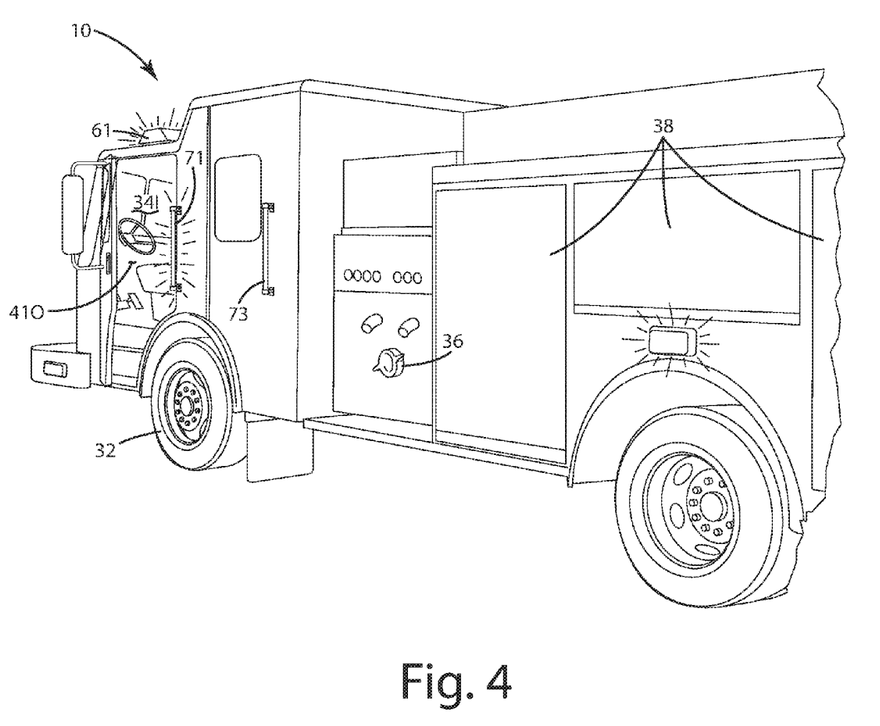
FIG. 4 is a rear perspective view of the firefighting apparatus with a forward signal light grab handle illuminated during a flashing pattern.
Figure 5:
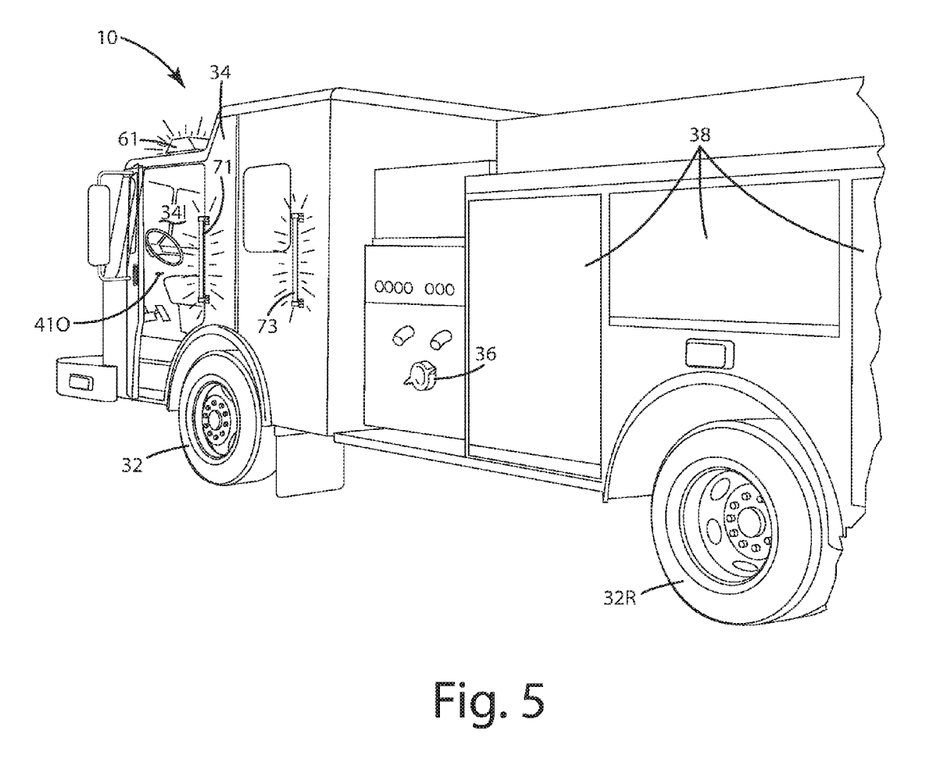
FIG. 5 is a rear perspective view of the firefighting apparatus with a forward signal light grab handle and a rearward, second signal light grab handle illuminated during a flashing pattern.

Turning now to FIGS. 1, 4 and 5, the cab 34 can be located in the forward portion 31 of the frame or body 30. The cab can be adapted to house one or more occupants of the apparatus. Those occupants can be firefighters, rescue victims, officers, authorities or other personnel. Although referred to as an occupant, that phrase is not necessarily mean that the person is occupying or in the cab. Rather it may be that an occupant is a person standing upon the truck, for example on the body or on a platform, or a person waiting to board the truck, standing or located on the ground. The cab 34 can be configured to include one or more exterior doors on the first 35A and second 35B sides of the truck 10. As an example, on the driver side of the truck, a first door 41 can be disposed.

The first door 41 can be mounted in an opening 410 defined by the cab, and can be selectively opened and closed relative to the cab, to provide an occupant ingress and egress relative to a cab interior 341. The first exterior door 41 can be located forward of the front axle 32AF and can provide access to a driver's seat of the vehicle, optionally including a steering wheel (not shown) near the seat.

The first door 41 can be swingably mounted to the cab via a hinge 41H so that the door can swing open in the direction S1, generally toward the front of the truck and away from the front wheels 32 and cab 34, as well as the signal light grab handle 71, described further below. The door 41 can include a front edge 41F and a rear edge 41R. The door also can be outfitted with a handle 41A that is configured to open and close the door, providing a securing latch or lock mechanism so that the door remains shut when desired.

Rearward of the first door 41 an outer exterior panel 50 can be disposed. This outer panel can form another portion of the cab 34, and can be located above the front wheel 32. This exterior panel can be in the form of a sheet of metal, optionally painted, coated or treated on the exterior surface thereof. The panel can be mounted to underlying structure, such as an elongated tube or support frame via welds, fasteners, rivets and the like. This exterior panel 50 can be mounted rearward of the rear edge 41R of the first door 41. The exterior panel can extend from above the wheel well 32W, or above the first axle 32AF toward a roof 34R of the cab.

Optionally, the cab 34 can include a second door 43 on the passenger side or second side 35B of the truck 10. This door can be set up the same way as the first door 41. The cab 34 also can include a third door 43 mounted rearward of the first door 41 as well as rearward of the exterior outer panel 50 on the first side 35A of the truck 10. This third door can be mounted with a hinge 43H to the cab 34 and optionally to the exterior panel 50. This door can include a front edge 41F and a rear edge 43R. This third door also can include a separate dedicated handle or latch 43A to enable an occupant to open and close the third door. Generally this third door 43 can be mounted rearward of the front axle 32AF and can provide ingress and egress relative to the cab interior 341. This third door also can swing open forwardly, toward the first signal light grab handle 71 but away from the second signal light grab handle 73 as described below. Rearward of the third door 43, an additional or second outer panel 52 can be mounted to complete the portion of the cab behind that third door.

Optionally, the exterior or outer portions of the cab 34, the first exterior door 41, the third exterior door 43 and the panels 50 and 52 form portions of the cab exterior, along with any windows associated with the cab.

Further optionally the fire truck 10 can be outfitted with a light bar 61 mounted to the roof 34R of the cab 34. The truck also can include headlights 62 mounted to the front of the cab to provide illumination while the fire truck is driving in dark environments. The truck optionally can include signal or warning lights 63 mounted on the bumper 34B of the cab. As used herein, signal lights, warning lights and signal warning lights can be used interchangeably, and in general can encompass lights that provide signals and/or warnings. Additional lights 64 can be included on the truck in the rearward portion 33. All of these lights can be in communication with a network and/or controller 10C mounted on board the truck 10. This controller can be a computer or similar device adapted to control one or more of the lights the truck as well as other operating systems of the truck. This controller optionally can be in communication with a human interface, such as a toggle switch, control knob or the like so that an occupant can select different modes of operation for the lights.

The controller 10C optionally can be configured to operate any lights on the truck in one or more modes. For example, the controller can operate the lights in a sleep mode, so that one or more of the lights emit no illumination. Generally in this mode, no power or a very low power is supplied to the respective lights on board the truck, for example, to a turn signal, a warning light, headlights and the lights of the signal light grab handles 71 and 73 as described below. As another example, in a signal mode, the controller can provide power, upon an input selection by an occupant, to preselected lights, for example to a turn signal, a warning light, headlights and/or signal light grab handles to illuminate the respective lights constantly and/or intermittently depending on the application and the particular light. As yet another example, in a flashing mode, the controller can provide power, upon input selection by occupant, to preselected lights, for example to the light bar 61, the warning lights 63 and 64, as well as the lights of the signal light grab handles 71 and 73 as described below. In this flashing mode, lights controlled by the controller can emit illumination in a predefined flashing pattern. For example the controller can illuminate the light bar 61 so that it flashes and/or illuminates for predetermined amounts of time in predetermined patterns. As another example, the controller can illuminate one or both of the signal light grab handles 71 and 73, for predetermined amounts of time in predetermined patterns. In such a flashing pattern, each of the signal light grab handles 71 and 73 on a side of the truck can be illuminated sequentially, simultaneously, or in some other timed pattern to provide warning or signal function. Of course, in some applications the controller can illuminate the signal light grab handles 71 and 73 in the signal mode, in which case those handles can operate as turn signals or other illumination.

As mentioned above, the truck 10 includes one or more signal light grab handles 71, 72, 73 and 74. As shown in FIG. 1, first and second signal light grab handles 71 and 73 can be mounted on a first side 35A of the truck 10. The second and fourth signal light grab handles 72 and 74 can be mounted on the second, opposing passenger side of the truck 35B. Of course, although four signal light grab handles are illustrated in this embodiment, the number of signal light grab handles can vary, as well as their location on the truck. For example there can be one, two, three, four, five, ten or more signal light grab handles, depending on the particular firefighting apparatus and the optional availability of grab handles on that apparatus.

Details of the signal light grab handles will now be described with reference to the first signal light grab handle 71 in FIGS. 6 and 7. It will be appreciated that the other signal light grab handles 72, 73 and 74 can be similar and/or identical to this signal light grab handle, so those other handles will not be described in further detail here.

The first signal light grab handle 71 can be mounted rearward and distal from the first door 41. As an example, the signal light grab handle 71 can be mounted rearward of the rearward edge 41R of that door 41. The signal light grab handle 71 can be mounted above the wheel well 32W, as well as above the front axle 32AF and wheel 32. The signal light grab handle 71 can be mounted below and distal from the roof 34R. Of course in some applications, the handle can be mounted to the roof, or even to the body, rearward of the cab.

The signal light grab handle 71 can be mounted rearward of the handle or latch 41A the first door 41. The handle also can be mounted forward of the optional third door 43, in particular, forward of the hinge 43H of the rearward door. Where the cab 34 includes first and third doors on the first side 35A, the first handle 71 can be mounted between the first and third doors, but closer to the first door, so that handle 71 can be used by an occupant to enter the opening 41O that the first door closes.

The signal light grab handle 71 can be rigidly and immovably joined with the truck, in particular the cab 34 and specifically to the exterior of the cab 34. Generally, this signal light grab handle is mounted outside the interior 341 of the cab. Further optionally, the signal light grab handles include no parts or portions that move in any direction relative to the cab or exterior unless those parts and/or the signal light grab handle is disassembled relative to the truck. Even further optionally, there are no moving or swinging components to the signal light grab handle.

Figure 6:
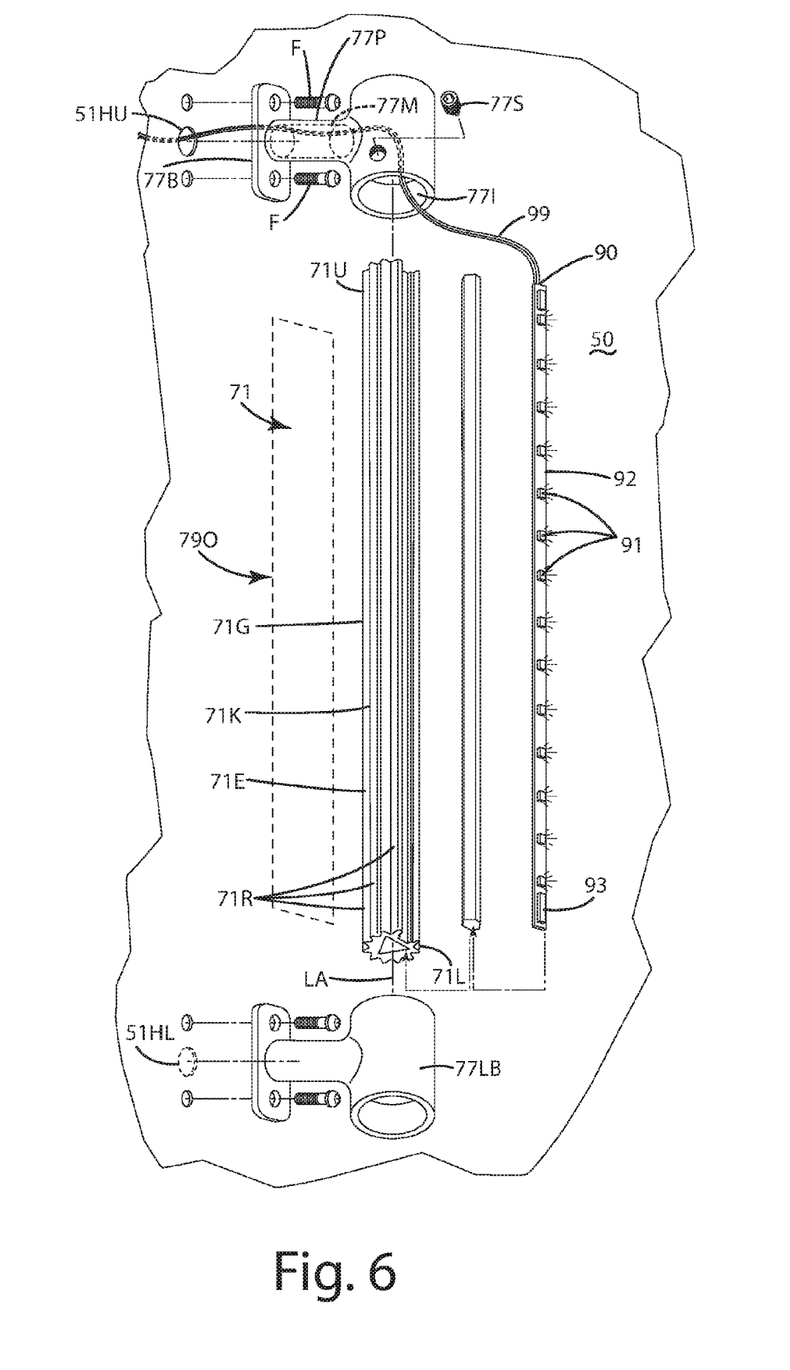
FIG. 6 is an exploded view of the signal light grab handle and components.

As illustrated in FIGS. 1 and 6, the signal light grab handle is oriented vertically, optionally in a vertical plane VP. This vertical plane VP can be perpendicular to the ground G upon which the fire truck 10 is parked. Of course, the signal light grab handle can be slightly off from vertical, and mounted substantially vertical, in which case the longitudinal axis LA of the grab handle 71 can be parallel to, and/or about 1° to about 10° tilted relative to the vertical plane. Optionally, in yet other constructions, the longitudinal axis LA of the signal light grab handle 71 can be horizontal, or generally perpendicular to the vertical plane VP, to provide a different type of grasping surface depending on the application.

Figure 7:
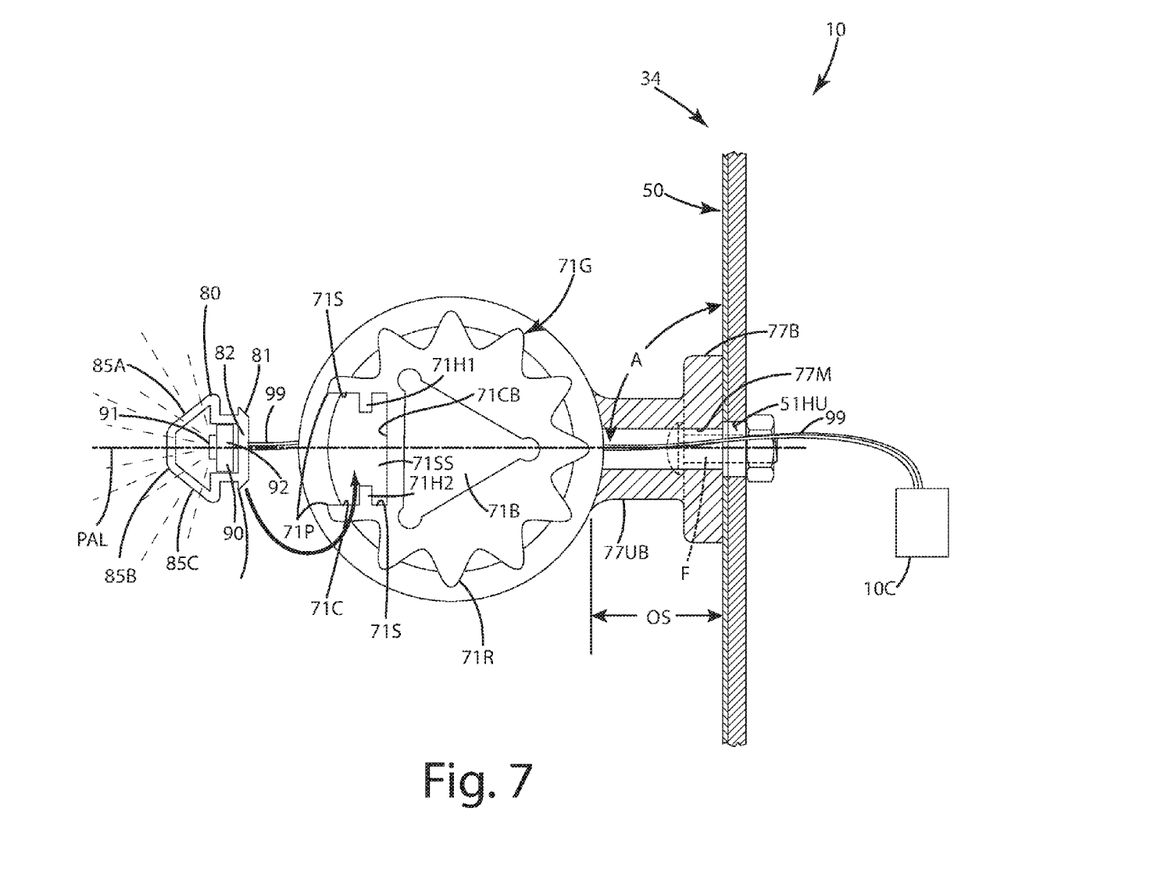
FIG. 7 is a close-up view of central grab rail and a partial section of a bracket that secures the central grab rail to an outer panel of the truck.

As shown in FIGS. 6 and 7, the signal light grab handle 71 can include a central grab rail 71G including an upper end 71U and a lower end 71L, which are distal from one another. The central grab rail can be constructed from a metal, a composite, a polymer and/or combinations thereof. Optionally the central grab rail can be an extruded aluminum, steel or alloy including the desired surface features upon extrusion. Between the upper end and lower end, the exterior surface 71E of the grab handle 71 can include a plurality of ribs 71 or other surface contours to enhance the grip and grasping of that rail by an occupant. These ribs or contours can be formed during the extruding process. Of course, the central grab rail can be machined, molded or otherwise constructed using processes other than extrusion.

The central grab rail 71G optionally can define an internal bore 71B that extends from the upper to the lower end. Although it is shown as triangular in FIG. 7, this bore can be of virtually any cross-section, for example, circular, elliptical, polygonal and the like. This bore can be included in the grab rail to reduce the overall weight of the rail while maintaining its structural integrity. It also can provide a conduit through which a connector wire of a lighting element as described below is disposed.

The central grab rail 71G, as shown in FIG. 7, can define a longitudinal recess or channel 71C. The recess 71C can open outwardly and away from an outer panel 50 or the cab 34. The recess can include a bottom 71CB and opposing sides 71S. The sides 71S can include one or more projections or shoulders 71H1 and 71H2 that extend outwardly from the sides 71S. As described further below, these shoulders can be used to join a housing 80 and/or a light strip 90 fixedly and securely to the central grab rail 71G. Optionally, the bottom, sides and shoulders can form a securement slot 71SS above the bottom 71CB within a portion of the recess 71C. The slot can capture at least part of the housing and/or light strip.

The signal light grab handle 71 can include a light strip 90 as mentioned above. This light strip can be in the form of a strip having multiple light sources. For example, the strip can be an LED strip, having multiple light emitting diodes or LEDs 91 mounted to a base strip 92. The multiple LEDs can be in series and/or parallel to one another or otherwise electrically coupled to one another and optionally to a connector wire 99. The LED strip 90 optionally can include a printed circuit board, converter, inverter or other device 93 to assist in the operation of the LEDs.

The LED strip can extend from the upper and 71U to the lower and 71L the central grab rail 71G and can be housed substantially within the recess 71C. In some cases, the LED strip 90 and/or the housing can be mounted below the outermost peripheries 71P of the central grab rail so that it is less likely to be damaged via impact with objects or crushing forces while grasping the rail. This LED strip 90 can be disposed directly in the recess 71C of the central grab rail 71G, or it can be housed in a housing 80.

Optionally the multiple LEDs 91 are aligned linearly with one another along the LED strip 90. The respective LEDs, for example at least 5, 10, 15 or more LEDs, can be spaced optionally 1 mm to 100 mm, further optionally 1 mm to 50 mm, and even further optionally 1 mm to 25 mm from one another. The LEDs also can be aligned to present a primary axis of illumination PAL, along which a majority of light is emitted from the strip. The amount of illumination can be varied depending on the transmissive and/or reflective properties of the housing 80 and/or the configuration of the LEDs. Indeed, the housing can be formed to include certain reflective surfaces and/or prisms to focus the primary axis of illumination in a particular direction. Generally, the primary axis of illumination PAL faces outward relative to the outer panel 50 and/or the cab 34 of the truck 10. This is so that the emitted illumination is not wasted by the LED strip being pointed toward the truck. Optionally, as shown in FIG. 7, the primary axis of illumination can be disposed at an angle A relative to the outer panel 50 of optionally between 45° and 135°, further optionally between 60° and 120°, even further optionally between 80° and 100°, yet further optionally about 90°. Of course, other angles can be selected depending on the application.

As mentioned above, the housing 80 can be constructed to house the LED strip 90. This can protect the LED strip from liquids, heat, moisture or other environmental factors to preserve or prolong the life of the LEDs. Optionally the housing can include a base 82 and multiple exterior surfaces 85A, 85B and 85C. These exterior surfaces can angle relative to one another as shown, or the surfaces can be part of a compound curved surface. The base 82 can be sized to fit within the recess 71C, and in particular to fit at least partially between the shoulders 71H1 and 71H2. The housing can include one or more flanges 81 and 83 extending from the base and/or adjacent the base. These flanges 81 and 83 can be slightly tapered on a front side so that when the housing is pressed between the shoulders of the recess, those flanges can effectively slide past the shoulders. After they slide past the shoulders, a rearward lip of the respective flanges can engage the shoulders effectively trap the housing within the rail 71G.

Optionally, in some applications, the flanges 81 and 83 are not tapered. In this case, they can be slid from an end, for example the upper end or lower end of the rail into the recess, for example, into a slot 71SS so that the shoulders capture the housing and/or board. Further optionally, after installation of the housing 80 in the recess 71C, that housing can be glued, cemented, or fastened with fasteners to the grab rail for a secure fit.

The housing 80 can be constructed from a translucent, transparent and/or light transmitting material, for example clear or frosted polymers, composites and the like. Of course, in some applications, the housing can be constructed from an opaque material having reflectors therein and minute openings within which the LEDs or other light sources project.

As shown in FIGS. 6 and 7, the LED strip 90 can include or be joined with a connector wire 99. This connector wire 99 can extend through a portion of the housing and/or the grab rail 71G. Ultimately, the connector wire 99 can extend through an upper hole 51HU defined by the exterior outer panel 50, and can be connected with a power source and/or a controller 10C. The power source can provide power to illuminate the multiple LEDs, and the controller provides control over the mode of that illumination.

Optionally, in some applications, the connector wire 99 can be absent. In this case, the LED strip 90 can include circuitry so that it can be inductively coupled to an onboard power source and/or controller 10C within the cab. Of course, other modes of powering the lights are contemplated, without use of the connector wire 99.

The signal light grab handle 71 can be mounted fixedly and immovably to the truck. As shown in FIG. 6, the handle 71 can include one or more brackets 77UB and 77LB to secure the central grab rail to the outer panel 50 and generally to the cab 34. The upper bracket 77UB can include an internal bore 771 within which the upper end 71U of the grab rail interfits. The grab rail 71G can be secured in the upper bracket with a setscrew 77S, to aim and secure the rotational orientation of the primary axis of illumination PAL. Of course, the internal bore 771 alternatively can be contoured with corresponding ribs or a projection to engage the ribs 71R of the grab rail 71G, thereby preventing the grab rail from rotating therein, and to assist in aiming the primary axis of illumination PAL.

The upper bracket 77UB can include a pillar 77P that extends to a base 77B. The pillar can include a pillar bore 77M that extends from the internal bore 771 and through the base 77B of the bracket 77UB. This pillar bore 77M can align with a hole 51HU defined by the outer panel 50. Accordingly, the connector wire 99 can be extended through the internal bore, the pillar bore and the base, ultimately into the interior of the cab and behind the exterior or outer panel 50. The base 77B can include one or more base holes that are aligned with corresponding holes in the outer panel 50. One or more fasteners F can project through the base holes and can be screwed into the outer panel 50 to secure the bracket to that outer panel. Of course, in other constructions, the fasters can be deleted and the base welded to the outer panel 50. In yet other constructions, the pillar 77P can be threaded into corresponding threads defined by the outer panel 50. Other constructions are contemplated to secure the bracket to the panel.

The lower bracket 77LB can be similarly constructed to the upper bracket 77UB, and can include similar features. Optionally, if additional connector wires are used with the LED strip 90, those wires can be snaked through bores of the lower bracket 77LB and through a lower hole 51HL defined by the outer panel 50.

Although not shown, one or more elastomeric gaskets optionally can be disposed between the base 77B in the exterior panel 50 to prevent liquids, contaminants and/or debris from entering the cab through the holes for the fasteners and the connector wire. Further, the brackets can include one or more seals to further prevent fluids from entering the cab through those brackets.

Figure 2:
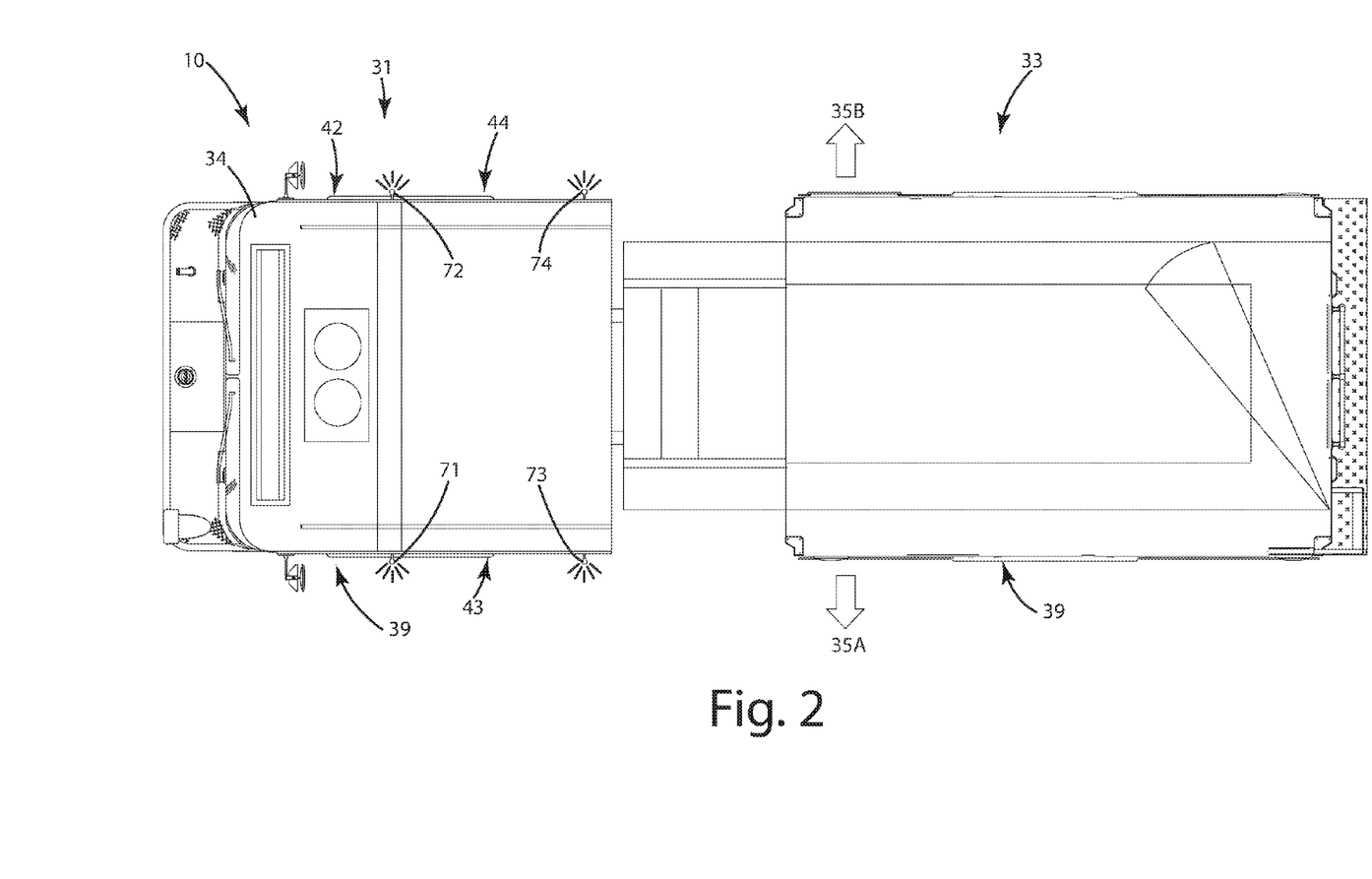
FIG. 2 is a top view of the firefighting apparatus.
Figure 3:
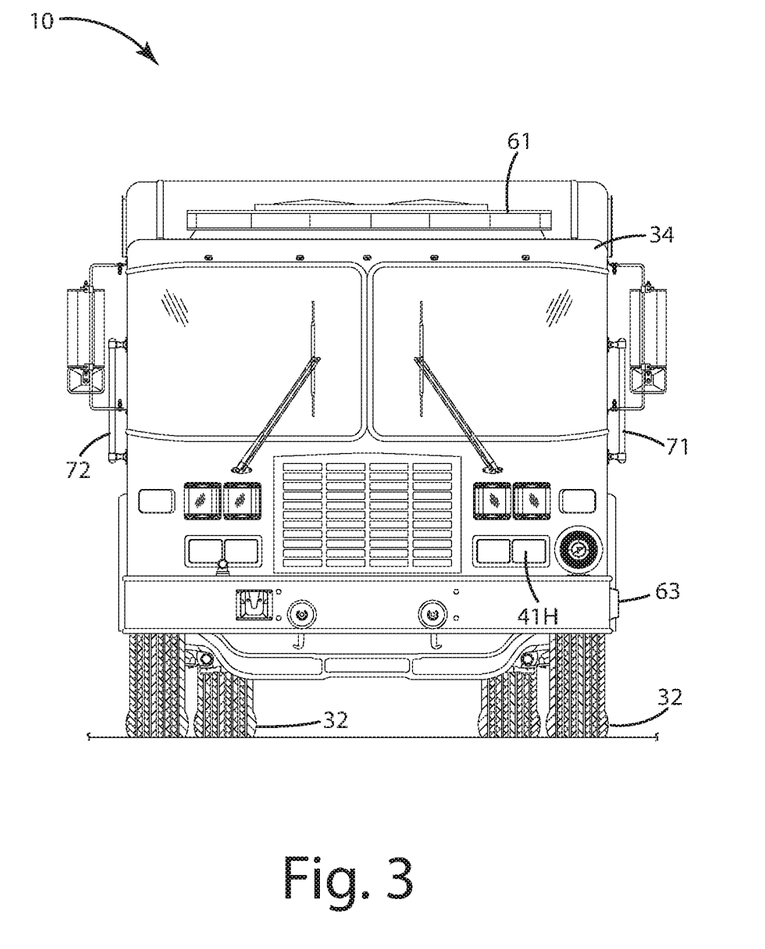
FIG. 3 is a front view of the firefighting apparatus.

As mentioned above, the fire truck 10 can include more than one signal light grab handle, for example, as illustrated in FIGS. 1 and 2, it can include first, second, third and fourth signal light grab handles. These grab handles can be oriented on opposing first and second sides of the truck. In addition, the third and fourth signal light grab handles can be disposed on the same side of the truck, in different locations relative to the doors, to assist occupants in entering those respective doors. Again, for example, the first signal light grab handle 71 can be disposed rearward of the first door 41 and forward of the third door 43. The third signal light grab handle 73 on the same side can be disposed rearward of both the first and third doors. The second signal light grab handle and the first signal light grab handle both however can be mounted on the cab exterior. In other applications, the signal light grab handles can be mounted to the rearward portion 33 or the body of the truck.

Operation of the firefighting or rescue apparatus of the current embodiments will now be described. The firefighting apparatus 10, optionally in the form of a pumper fire truck, can be used to fight fires in a building or other structure. As illustrated in FIGS. 4 and 5, the fire truck can be driven to the emergency location and parked there. In transit to the emergency location, or at the emergency location, an occupant of the truck can manipulate a control switch or toggle to control the controller. The occupant can set the controller from one mode to another, and the various lights of the truck can be illuminated to provide warning lights and/or signal lights to observers of the truck to alert those observers of the emergency.

As shown in FIGS. 4 and 5, the first and second signal light grab handles can be illuminated in a flashing pattern in which the first grab handle signal light 71 illuminates, while the third grab handle signal light 73 does not illuminate, as shown in FIG. 4, and then the first and third grab handle signal lights 71 and 73 illuminate simultaneously, as shown in FIG. 5. A variety of other patterns can be selected depending on the application.

After the fire truck 10 is no longer in transit, or is removed from the emergency location, the lights, including the signal light grab handles can be put into a sleep mode so that they no longer emit illumination. The firefighting apparatus then can be transported back to its garage or station.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual elements of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A firefighting apparatus, comprising:
a body including a plurality of wheels configured to enable transportation of the apparatus to an emergency location, the body including a forward portion having a cab adapted to house at least one occupant of the apparatus, a rearward portion located rearward of the cab, a first side and a second side opposite the first side, the cab including a first door on the first side and a second door on the second side, the first and second doors dimensioned to provide occupant ingress and egress relative to a cab interior, the cab including a cab exterior and an outer panel defining at least one of an upper hole and a lower hole distal from the first door; and
a signal light grab handle mounted to the cab exterior,
wherein the signal light grab handle is mounted rearward and distal from the first door,
wherein the signal light grab handle is oriented substantially vertically,
wherein the signal light grab handle includes a central grab rail configured to enable the occupant to wrap a hand around the central grab rail, the central grab rail including an upper end and an opposing lower end,
wherein the upper end is joined with an upper bracket and the lower end is joined with a lower bracket, the upper and lower brackets rigidly and immovably joining the central grab rail with the cab so that there is an open space between the central grab rail and the outer panel, the open space sized to enable human digits to project between the central grab rail and the outer panel while an occupant grasps the central grab rail with the hand,
wherein the central grab rail defines an elongated recess spanning between the upper end and the lower end of the central grab rail,
wherein an light strip, having a plurality of lights, is mounted at least partially within the elongated recess, the light strip outwardly disposed relative to the cab exterior,
wherein the light strip is joined with a wire that extends out from the elongated recess, through at least a portion of at least one of the upper bracket and the lower bracket, and through the at least one of the upper hole and the lower hole defined by the outer panel,
wherein the wire is in electrical communication with a power source that provides power to illuminate the lights,
whereby the signal light grab handle provides at least one of warning lights and signal lights to observers of the firefighting apparatus when actuated.

2. The firefighting apparatus of claim 1 wherein the light strip includes a primary axis of illumination, wherein the primary axis of illumination points outward, away from the outer panel of the cab.

3. The firefighting apparatus of claim 2, wherein the primary axis of illumination is disposed at an angle between 60 degrees and 120 degrees relative to the outer panel of the cab.

4. The firefighting apparatus of claim 3, wherein the primary axis of illumination is disposed at an angle of about 90 degrees relative to the outer panel of the cab.

5. The firefighting apparatus of claim 1 comprising a housing within which the light strip is disposed,
wherein the housing includes first and second flanges that are restrained by respective first and second shoulders of the central grab rail.

6. The firefighting apparatus of claim 1 wherein the housing is at least one of transparent and translucent.

7. The firefighting apparatus of claim 1 wherein the central grab rail defines a bore extending from the upper end to the lower end, and a contoured outer surface to enhance gripping thereof by an occupant.

8. The firefighting apparatus of claim 1 comprising:
a third door adapted for occupant ingress and egress relative to the cab interior, the third door being on the first side, the third door being rearward of the first door on the cab; and
another signal light grab handle mounted to the cab exterior, rearward and distal from the third door,
wherein the signal light grab handle mounted rearward and distal from the first door is mounted forward and distal from the third door.

9. The firefighting apparatus of claim 1 comprising:
a tank sized to hold a quantity of firefighting fluid, the tank joined with the frame rearward of the cab; and
a pump in fluid communication with the tank and adapted to pump liquid through a firefighting hose.

10. The firefighting apparatus of claim 9 comprising a controller operably coupled to the light strip, the controller configured to illuminated the plurality of lights in a plurality of flashing patterns, whereby emergency warning indications are provided to observers of the firefighting apparatus.

11. A firefighting apparatus comprising:
a body including a plurality of wheels configured to enable transportation of the apparatus to an emergency location;
a cab mounted over at least one of the plurality of wheels, the cab adapted to house at least one occupant of the apparatus, the cab including a first side and a second side opposite the first side, the cab including a first door on the first side and a third door on the first side rearward of the first door, the first and third doors dimensioned to provide occupant ingress and egress relative to a cab interior, the cab including a cab exterior and an outer panel defining at least one of an upper hole and a lower hole distal from the first door; and a signal light grab handle mounted to the cab exterior, wherein the signal light grab handle is mounted rearward from the first door, and forward from the third door so that the signal light grab handle is between the first door and the third door, and not mounted on either of the first door or the third door;

wherein the signal light grab handle includes a central grab rail configured to enable the occupant to wrap a hand around the central grab rail, the central grab rail including an upper end and an opposing lower end, wherein the signal light grab handle includes a longitudinal axis extending from the upper end to the opposing lower end, the longitudinal axis being oriented substantially vertically, wherein the signal light grab handle is rigidly and immovably joined with the cab with an open space between the central grab rail and the outer panel, the open space sized to enable human digits to project between the central grab rail and the outer panel while an occupant grasps the central grab rail with the hand, wherein the central grab rail is constructed from metal and defines an elongated recess spanning between the upper end and the lower end of the central grab rail, wherein an light strip, having a plurality of lights, is mounted at least partially within the elongated recess, the light strip outwardly disposed relative to the cab exterior so as to project light outward and away from the outer panel when the light strip is actuated, wherein the light strip is operable in a flashing mode in which the plurality of lights emit illumination in a predefined flashing pattern, and a sleep mode in which the plurality of lights emit no illumination;

wherein the light strip is joined with a wire that extends away from the light strip, and through at least one of the upper hole and the lower hole defined by the outer panel, wherein the wire is in electrical communication with a controller that operates the light strip in the flashing mode to illuminate the plurality of lights in the predefined flashing pattern, whereby the signal light grab handle provides at least one of warning lights and signal lights to observers of the firefighting apparatus when actuated.

12. The firefighting apparatus of claim 11, wherein the third door is mounted to the cab with a third door hinge, wherein the third door hinge is rearward of the signal light handle so that as the third door hinges open, it swings toward the signal light handle.

13. The firefighting apparatus of claim 12, wherein the first door is mounted to the cab with a first door hinge, wherein the first door hinge is forward of the first door and the signal light handle so that as the first door hinges open, it swings away from the signal light handle.

14. The firefighting apparatus of claim 11, wherein the light strip is housed in a housing, wherein the housing includes first and second flanges extending from a base, wherein the central grab rail includes first and second shoulders that trap the first and second flanges respectively, thereby securing the housing and light strip to the central grab rail.

15. The firefighting apparatus of claim 12, wherein the signal light grab handle includes upper and lower brackets joined with the central grab rail, wherein at least one of the upper and lower brackets includes a pillar extending toward the outer panel, the pillar joined with a bracket base;

wherein the bracket base defines a first fastener hole and a second fastener hole;

wherein the bracket base is joined with the outer panel via a first fastener extending through the first fastener hole and the outer panel, and a second fastener extending through the second fastener hole and the outer panel.

16. The firefighting apparatus of claim 15, wherein the pillar defines a connector bore, wherein the outer panel defines a connector hole aligned with the connector bore;

wherein the light strip is joined with a wire that extends through the connector bore, through the connector hole and into an interior of the cab.

* * * * *